Figure 19:
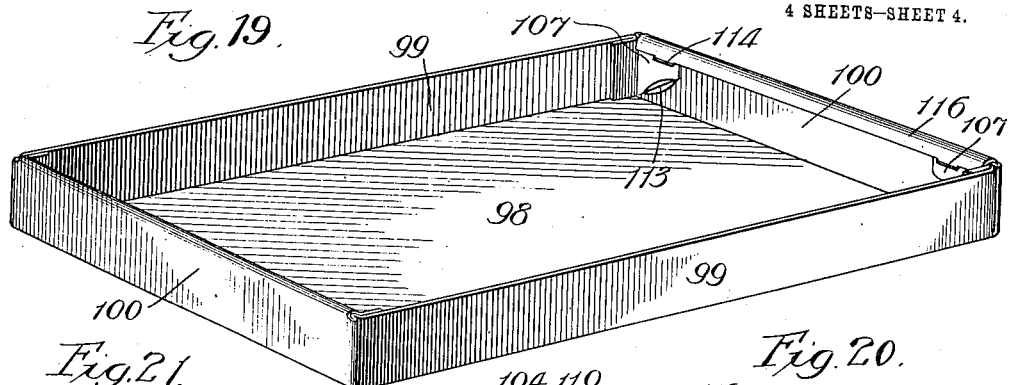

S. BACHMANN.
BOX.
APPLICATION FILED MAR. 25, 1910.
1,083,048.
Patented Dec. 30, 1913.
4 SHEETS—SHEET 1.
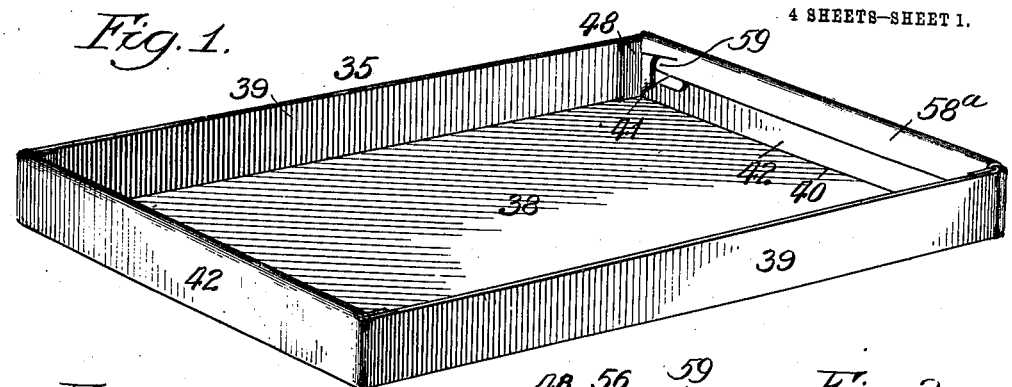
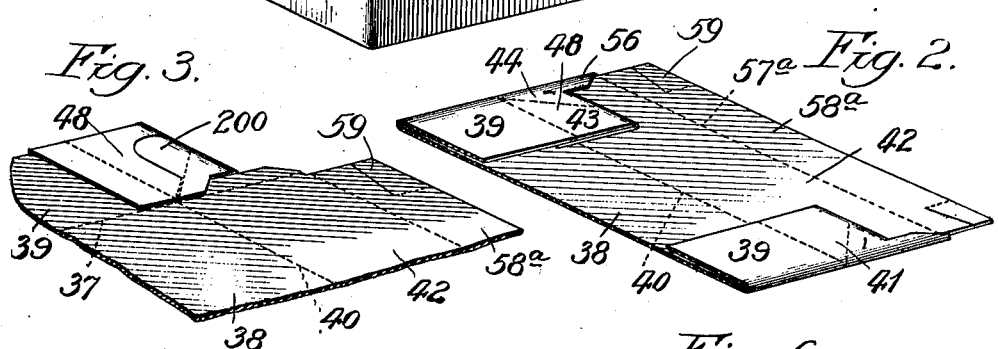
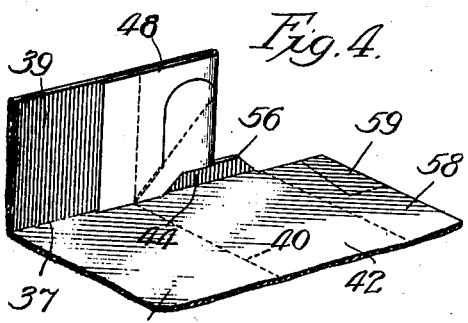
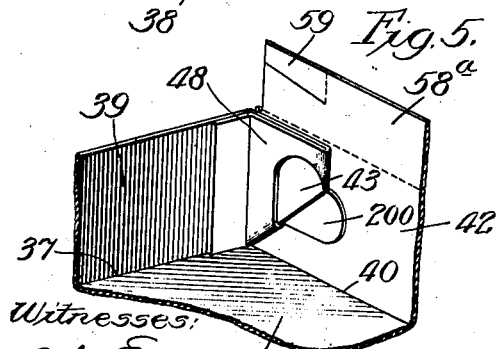
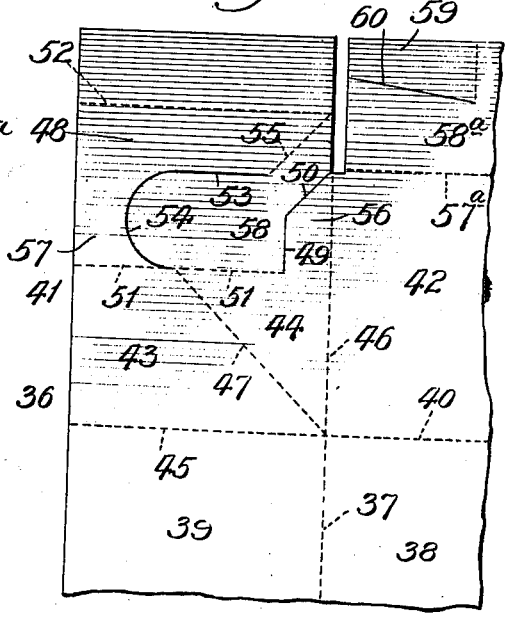
Witnesses:
John Enders
Chas. H. Buell
Inventor:
Siegmund Bachmann
By Dyrenforth, Lee, Chritton & Wiles,
Attys.

S. BACHMANN.
BOX.
APPLICATION FILED MAR. 25, 1910.
1,083,048.
Patented Dec. 30, 1913.
4 SHEETS—SHEET 2.
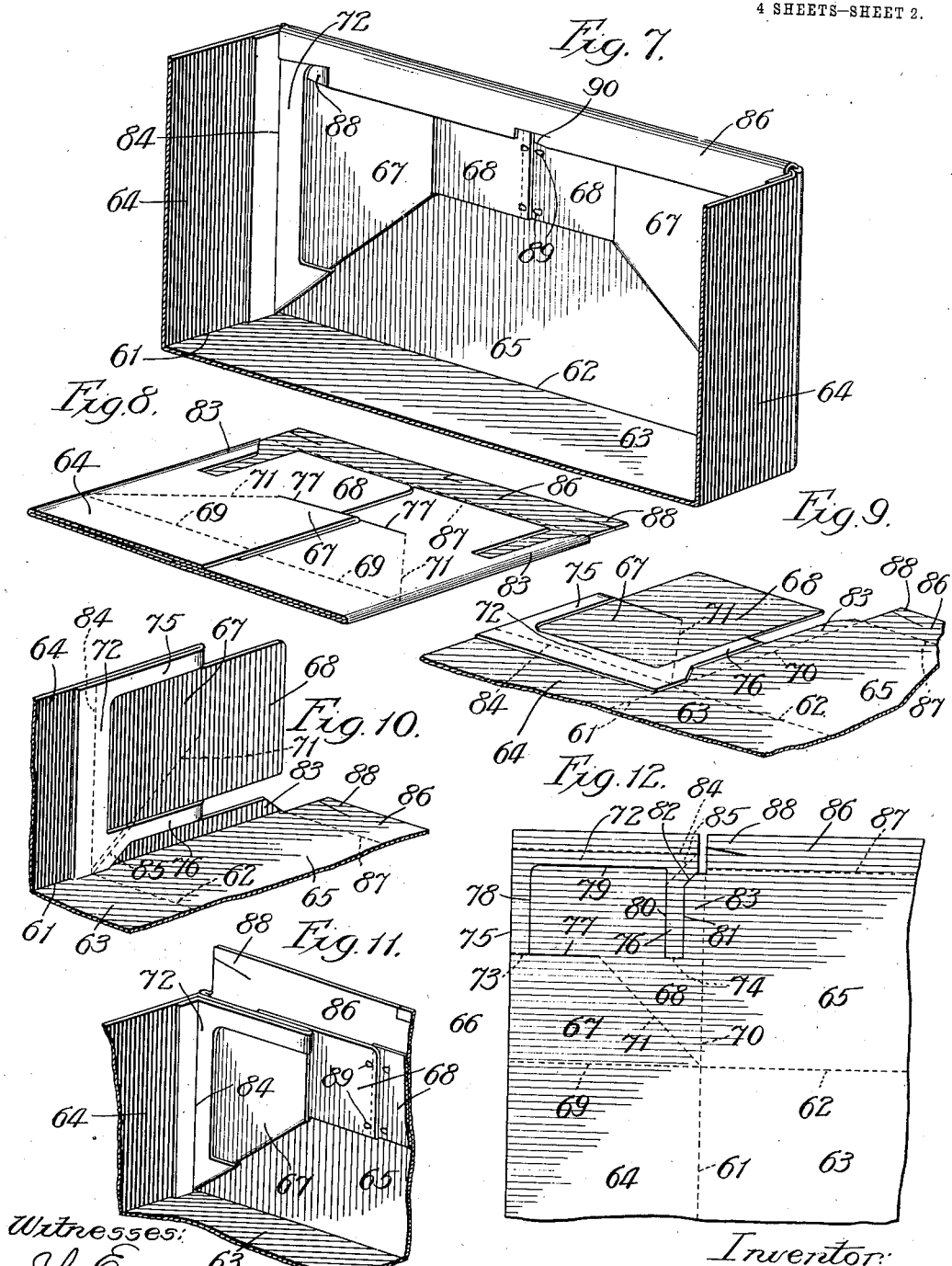

S. BACHMANN.
BOX.
APPLICATION FILED MAR. 25, 1910.
1,083,048.
Patented Dec. 30, 1913.
4 SHEETS—SHEET 3.
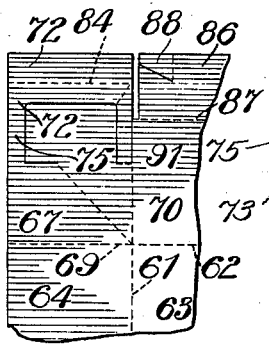
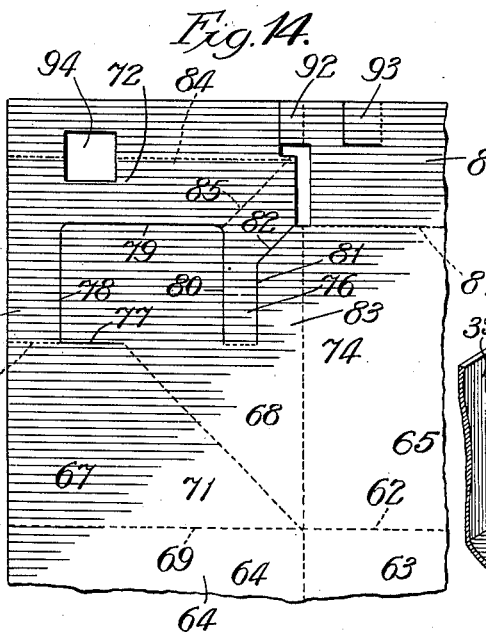
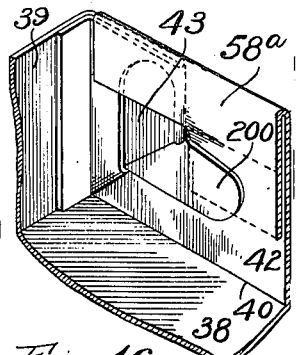
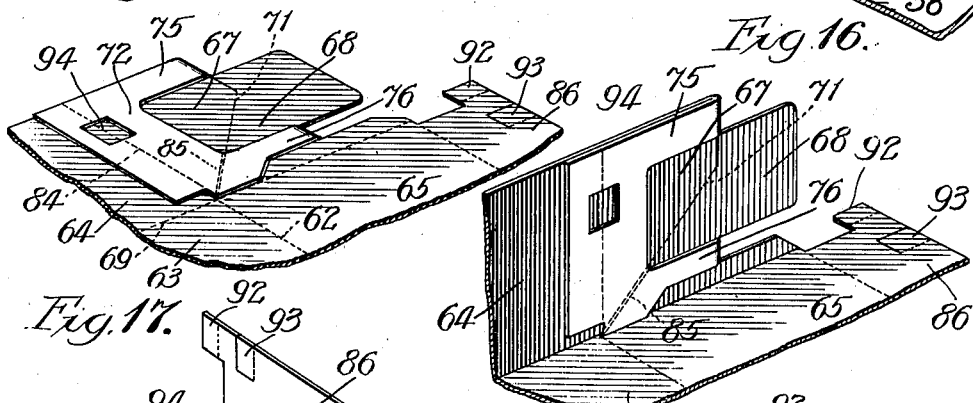
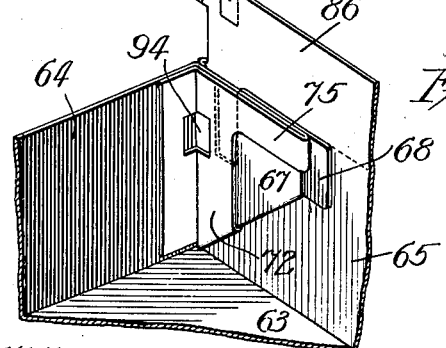
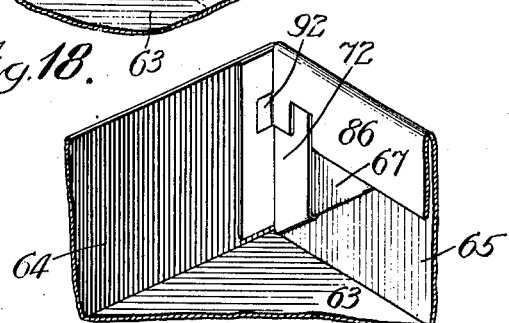
Witnesses:
John Enders
Chas. H. Buell
Inventor:
Siegmund Bachmann
By Dyrenforth, Lee, Chritton & Wiles,
Attys.

S. BACHMANN.
BOX.
APPLICATION FILED MAR. 25, 1910.

1,083,048.

Patented Dec. 30, 1913.
4 SHEETS—SHEET 4.

Witnesses:
John Enders
Chas. H. Buell

Inventor:
Siegmund Bachmann,
By Dyrenforth, Lee, Chritton & Wiles
Attys.

UNITED STATES PATENT OFFICE.

SIEGMUND BACHMANN, OF CHICAGO, ILLINOIS.

BOX.

1,083,048.

Specification of Letters Patent.   Patented Dec. 30, 1913.

Application filed March 25, 1910.   Serial No. 551,526.

*To all whom it may concern:*

Be it known that I, SIEGMUND BACHMANN, a citizen of the United States, residing at Chicago, in the county of Cook and State of Illinois, have invented a new and useful Improvement in Boxes, of which the following is a specification.

My invention relates to improvements in boxes formed from sheets of paper-box board, or other suitable material, involving in their manufacture the making of a blank of a desired form and bending such blank along folding lines to produce the box; and more particularly to the class of boxes in which their corner-portions are reinforced by sections of the corner-extensions overlying the extensions carrying them and lying flatwise against the adjacent walls of the box, as exemplified in United States Letters Patent Number 931,373, granted to me on August 17, 1909, for improvement in boxes, the present invention being in the nature of an improvement upon the construction of box forming the subject of this patent. It has been found in practice that under some conditions the interlocking lips or tongues on the corner-reinforcements, which when the box is erected are embraced between the end-walls of the box and the adjacent sections of the corner-extensions and which are provided to hold the reinforcements in position on the interior of the box, are liable to become accidentally withdrawn from such position while the box is in use.

One of my objects is to so construct the box that without the use of paste, or any fastener-device, the interlocking tongues or lips of boxes of the variety hereinbefore referred to, may be positively maintained in position for holding the corner-reinforcements in the position desired.

Another object is to provide novel means for fastening the corner-extensions in place with relation to the adjacent walls of the box in boxes of the type involving the reinforced corner-construction of the patent hereinbefore referred to; and still other objects are to so improve boxes of this type as to augment their usefulness.

Figures 20, 21:
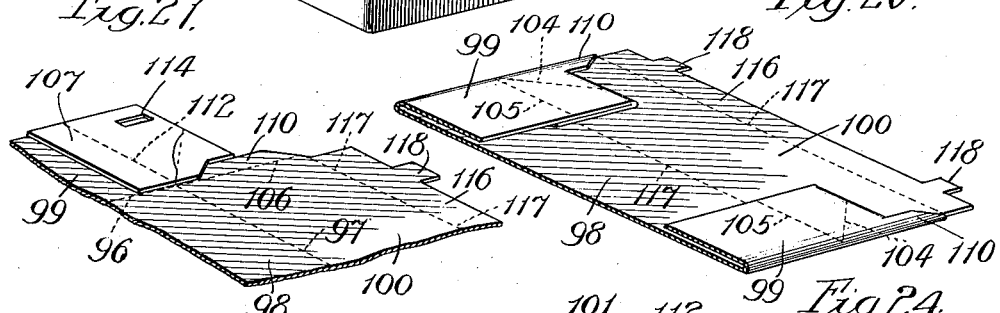
Figure 22:
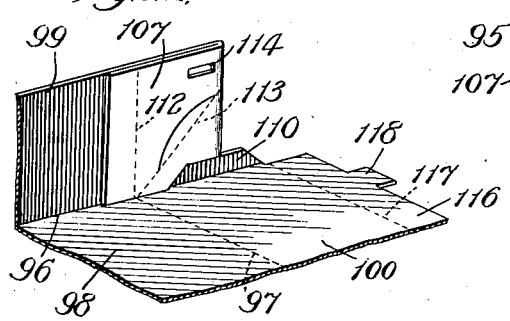
Figure 24:
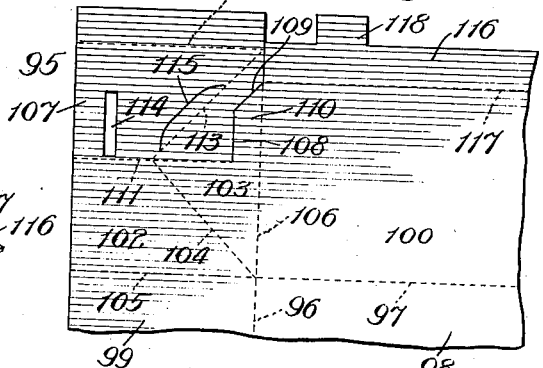
Figures 23, 25:
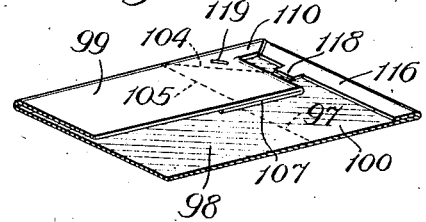

Referring to the accompanying drawings, in which five embodiments of my invention are illustrated, Figure 1 is a perspective view of a foldable paper-board box of the suit-box type illustrating a construction thereof embodying the preferred form of my invention. Fig. 2 is a view of one end of the box shown in Fig. 1, the box in this view being illustrated in collapsed condition. Fig. 3 is a perspective view of one of the four similar corner-portions of the box of Fig. 1, showing its walls unfolded and the portion of the corner-extension forming the reinforcement for one corner folded into position preparatory to erecting the box-walls. Fig. 4 is a similar view showing the wall carrying the reinforcement folded at a right-angle to the base, this position of the parts of the box being that which they may occupy during the righting of the box. Fig. 5 is a view like Fig. 3 of both walls erected and the corner-extension and reinforcement therefor folded into position. Fig. 6 is a plan view of one of the four similar corner-portions of the blank from which the box illustrated in Fig. 1 is constructed. Fig. 7 is a perspective view of one of the two opposite end-portions of a rectangular box of the hat-box type illustrating another embodiment of my invention. Figs. 8 to 12 inclusive are views similar to Figs. 2 to 6 inclusive, respectively, of a corner-portion of the box shown in Fig. 7 and a corner of the blank from which it is formed, showing the manner in which the walls of the box formed from the blank shown in Fig. 12 may be erected to form the box of Fig. 7. Fig. 13 is a view like that of Fig. 12 showing a slight modification of the blank of Fig. 12. Fig. 14 is a view like that of Fig. 6 of a blank from which a box having additional flap-securing means may be formed. Figs. 15, 16 and 17 are views like Figs. 2, 3 and 4, respectively, showing the manner in which the walls of the box, formed from the blank of Fig. 14, may be erected. Fig. 18 is a view of one of the corners of the completely erected box showing the end-flap secured in position. Fig. 19 is a perspective view of still another embodiment of my invention. Fig. 20 is a similar view of one end of this box showing it in collapsed condition. Figs. 21, 22 and 23 are views like Figs. 3, 4 and 5, respectively, showing the manner in which the walls of the box may be erected. Fig. 24 is a plan view of one of the four similar corner-portions of the blank from which the box of Fig. 19 is formed. Fig. 25 is a view of one corner-portion of the box of Fig. 19 showing the latter in a desired condition for shipment in knock-down condition; and Fig. 26, a view like Fig. 5 of a modification of the construction illustrated therein.

The type of box in connection with which I have chosen to illustrate my invention is of the collapsible variety involving, generally stated, a base having four walls hingedly connected with the base, with extensions carried on the ends of opposed walls adapted to be folded flatwise against the adjacent walls of the box and held in position against accidental displacement by flaps carried by the walls against which the extensions are folded.

Referring to Figs. 1 to 6 inclusive, the box in its erected condition is represented at 35. The blank 36 from which this box is formed consists of an oblong rectangular sheet of box-board, or the like material, provided with parallel folding lines 37 (one only of which is shown) along which the blank is foldable on the base 38 to form the side-walls 39 of the box, and parallel folding lines 40 disposed at right-angles to the lines 37 along which the blank is foldable to form the four corner-extensions 41 and the end-walls 42 of the box, this feature of the construction being the same as that disclosed in the above-referred to patent. As each of the four corner-extensions 41 of the box is of the same construction and is formed in the same manner, but one of such extensions is described in detail as follows: Each corner-extension 41 is formed of two sections 43 and 44 hingedly connected with the ends of the adjacent walls along the folded lines 45 and 46 and with each other along a diagonal folding line 47; and a third section 48 which is severed from the section 44 along a line 49 extending parallel with the line 46 and a line 50 which latter is at an angle to the line 49, the section being hinged to the sections 43 and 44 along the line 51 and being provided at its outer end with a folding line 52. The section 41 is slit along the line 53 paralleling the line 51 and along an arc-shaped line 54, a diagonal folding line 55 being provided in the section 48 extending from the inner end of the line 53 to its juncture with the folding line 52. The line 49 is located between the outer edge of the section 48 and the folding line 46, so that a tab 56 is formed on the section 44 and has hinged connection with the end-wall 42 along the line 46. By partially severing the section 48 from the sections 43 and 44 and cutting the section 48 along the lines 53 and 54, this section is connected with the sections 43 and 44 through the medium of two tongue-like members 57 and 58. The foldable sections of the extensions 41 are so formed that when the sections 48 are folded along the line 51 to the position illustrated in Fig. 4, they will overlie the adjacent ends of the walls 39 carrying them, the lines 52 registering with the adjacent folding lines 45. When the box is erected the sections 48 will fit into the corners of the box; the lines 55 registering with the lines 47. The end-portions of the blank intermediate the sections 41 are adapted to be folded inwardly and downwardly along dotted folding lines 57ª (one only of which is represented) to form end-flaps 58ª for a purpose hereinafter explained, these end-flaps being provided at their ends with tongues 59 formed by slitting the flaps longitudinally and preferably along the diagonal lines 60. To form the box 35 from the blank 36, the sections 48 are folded upon the lines 51 to the position illustrated in Fig. 3. The walls 39 with the sections 48 thus lying against them are then turned upon the folding-lines 37 and 46 to upright position as illustrated in Fig. 4, whereupon the end-walls 42 of the box are righted and the extensions 41 folded upon the lines 45, 46 and 47 and the diagonal lines 55, to cause the extensions 41 to extend inwardly and lie against the inner faces of the adjacent end-walls 42 of the box, the inner ends of the members 58 to lie between the sections 44 and the inner surfaces of these end-walls, and the outer ends of the sections 48 to lie against the side-walls, all as represented in Fig. 5 of the parts forming the box-corner therein illustrated. The flaps 58ª may then be folded inwardly along the folding-lines 57ª to overlap the extensions 41 for holding the latter in place, in which position these flaps in the construction illustrated are designed to be held in place by flexing the tongues 59 and introducing them between the adjacent extension-sections 43 and 48 into the pockets which are provided by forming the box as described, the position these tongues assume in the locking operation being that illustrated in Fig. 1. The box may be collapsed by withdrawing the tongues 59 from locking engagement with the sections 48 and then pressing the end-walls 42 outward and the side-walls 39 inward, to cause them to assume the position illustrated in Fig. 2, from which condition the box may be again readily righted by turning the end and side-walls at their hinged connections with the base to upright position, thereby causing the extensions to fold along the lines 45, 46 and 47 to the position illustrated in Fig. 5 and then fastening the flaps 58 in position as described; or the box may be collapsed to a position in which each corner thereof occupies the position represented in either Figs. 3 or 6, from which positions the box may be erected as hereinbefore described.

It will be noted from the foregoing description that the tongue-members 58 formed by cutting the sections 48 to form openings, when the box is set up, for receiving the tongues 59, are held against accidental withdrawal from their position of embrace between the sections 44 and the adjacent walls 42 of the box by reason of their hinged connection with the sections 44, when the extensions 41 and walls 39 and 42 are folded to form the erected box, and thus the reinforcing sections 48 are held in the proper position at all times against the inner surfaces of the box-corners while the box is erected.

The construction illustrated in Figs. 7 to 12 inclusive is of dimensions rendering it suitable for use as a hat-box. One of the four corner-portions of the rectangular blank from which this construction may be formed is represented in Fig. 12. The blank is formed with folding lines 61 and 62, one only of each of which is illustrated, defining a base 63 and side and end-walls 64 and 65, respectively. The corner-extensions represented at 66 are formed of two sections 67 and 68 hinged to the side and end walls along the folded lines 69 and 70 and to each other along the diagonal line 71; and a third reinforcing U-shaped section 72 hinged along lines 73 and 74 to the sections 67 and 68 through the medium of parallel tongues 75 and 76, the section 72 being partially severed from section 68 along the lines 77 to 82, inclusive, the line 81 being positioned to the left of line 70 in Fig. 12 and the line 82 being diagonal to form a tab 83, similar to the tab 56 of the preceding figures. The outer end of each section 72 is formed with a folding line 84 parallel with the folding lines 73 and 74 and each tongue 76 is formed with a folding line 85. The end walls 65 carry flaps 86 hinged thereto along lines 87 and formed with tongues 88 as described of the flaps 58ª. The box is formed from the blank in the manner described of that shown in the preceding figures, the sections 72 folding back against the sections 67 and 68, and the side walls 64 of the box and the line 85 registering with the line 71 as illustrated in Fig. 10. When the blank is folded to the position illustrated in Fig. 11, the end-flaps 86 may be folded down over the extensions 66 and the tongues 88 thereupon inserted between the sections 72 and the underlying sections 67 to the position illustrated in Fig. 7. The sections 68, where the box is of dimensions adapting it for use as a hat-box, are relatively long and where they meet as illustrated in Fig. 7 they may be fastened together as indicated at 89, as by staples or other fastening means passing through them and the walls 65, and the pocket thus formed be utilized to receive a longitudinally-extending tongue 90 as represented in Fig. 7 serving as additional flap-fastening means.

In Fig. 13 I have illustrated a blank which differs slightly from that illustrated in Fig. 12 as regards the location of the lower section-connecting tongue. In Fig. 13, this lower tongue which is indicated at 91 is represented as being in alinement at one edge with the folding line 70. Thus the connections between the tongues 91 thus formed, and the sections 68 is closer to the extremity of the sections 72 than in the case of the construction illustrated in Fig. 12, which is of advantage under some conditions.

The construction of box of Figs. 14 to 18, inclusive, is the same as that of Figs. 7 to 12, inclusive, excepting that in the first referred to construction the blank is so cut, as illustrated, as to form tongues 92 on the ends of the flaps 86, which extend longitudinally of the flaps 86 beyond the margins of the base 63, and similarly extending tongues 93 located intermediate the tongues 92 as represented in Figs. 14 and 18, the extremities of the reinforcing sections 72 containing openings 94 which register with the tongues 92 when the box is erected. The box may be erected as described of the ones illustrated in the preceding figures, the tongues 92 automatically springing into the adjacent openings 94 when the operation of righting the walls is effected and resisting any tendency to collapsing of the box by engagement with the walls of such openings. The additional flap-securing means just referred to serve to supplement the locking functions of the tongues 93 and under certain conditions their employment is desirable.

In Figs. 19 to 24, inclusive, is shown still another embodiment of my invention, these figures illustrating another form of means within my invention for securing the end-flaps of the box in position. One of the four similar corner-portions of the blank from which this box is made is represented at 95, the blank being of general rectangular form and having folding lines 96 and 97, one only of each of which is shown, defining the base 98 and side and end-walls 99 and 100, respectively, of the box. The corner-extensions of the box are represented at 101 and are formed of two sections 102 and 103 hinged together along the diagonal folding line 104 and to the adjacent side and end-walls of the box, as indicated at 105 and 106 respectively; and a third section 107 severed from the section 103 along the lines 108 and 109 to form on the section 103 a tab 110. The section 107 which has hinged connection with the sections 102 and 103 along a folding line 111 contains a folding line 112 near its outer end and parallel with its outer edge and a diagonal folding line 113 which extends from the junction of the line 104 with line 111 to the inner end of line 112. The section 107 contains a slot 114 extending at right angles to the line 111 and is slitted on the curved line 115 along the folding line 113. The end-walls 100 carry flaps 116 hingedly connected therewith along lines 117, these flaps being formed with transversely-disposed tongues 118 toward its opposite ends for a purpose hereinafter set forth. The blank is formed into the box of Fig. 19 as described of the preceding constructions and illustrated in Figs. 21 to 23 inclusive, the corner-sections bending inwardly upon the lines 104, 105, 106 and 113, and the section 107 lying against the sections 102 and 103 and the side-walls of the box as illustrated. After the corner-extensions and walls are erected, the flaps 116 are bent over the extensions and the tongues 118 inserted into the slits 114 between the reinforcing sections 107 and the sections 102 for holding the flaps 116 in position.

In Fig. 25 I have shown the box of Fig. 19 in collapsed condition, this view showing the box in a condition in which I prefer to ship it. In practice, the operator will first turn the end-flaps 116 down against the inner surface of the end-walls 100 and thereupon fold the extensions 107 to the position illustrated in Fig. 22 and then turn them down upon the base 98 and end-walls to cause the tabs 110 to overlap the ends of the flaps 116, as illustrated in Fig. 25. The operator will then staple or otherwise fasten the sections 103 and the inner portions of sections 107 to the end-walls as indicated at 119. The flaps 116 are thus held down and are prevented from interfering with the desired ease in handling the collapsed boxes. When it is desired to use the box the flaps 116 may be readily sprung out of engagement with the tabs 110 owing to their inclined ends, and the end and side-walls erected to form the box by turning the end-walls upwardly and inwardly and the side-walls upwardly and outwardly.

It will be understood that the blanks of the previously described constructions, as well as that of Fig. 19, may be folded to the position illustrated in Fig. 25. Furthermore, those portions of the corner-extensions which fit against the ends of the box in each of the constructions illustrated may be secured in position against such walls as indicated, by staples or in any other suitable manner, where it is desired that the box be shipped in collapsed condition. Such securing may take place, if desired, at the tabs represented at 200 which extend toward the center of the end-walls in each construction beyond the line at which the sections of the corner-extensions fold on each other in righting the box.

It will be manifest from the foregoing description and the drawings that the reinforcing corner-sections are joined to the other two sections of the corner-extensions through the medium of tongue-members integral with these sections, one of these members being located sufficiently close to the bottom of the box to hold the reinforcing section in position, and by reason of its integral formation with the sections carrying it being prevented from becoming accidentally displaced.

The feature of locking the corner-extensions in position by inserting tongues connected with adjacent walls between the reinforcing sections and the other adjacent sections of the corner-extensions, and particularly where such tongues are on flaps on such walls, is of value in box constructions, as it affords economical and effective means for holding the box erected, as the pockets for engaging with these tongues are formed in the act of stamping the blank.

While boxes employing retaining flaps on opposed walls, secured thereto in any suitable manner, are of the type to which I prefer to apply my invention, it is readily apparent that such invention, in so far as the feature of holding the reinforcing sections in place are concerned, will have utility in constructions corresponding to those illustrated with the end-flaps omitted. Such omission would, however, require the application to the extensions, after they and the walls had been righted and the box placed in non-collapsed condition, of means (not shown) for fastening the extensions to the walls against which they would lie and these means might be of any suitable form.

While I have illustrated certain forms of constructions in which my invention may be employed, I do not wish to be understood as intending to limit my invention to its embodiment in these particular forms, as various modifications of the constructions shown and described may be made without departing from the spirit of my invention.

The tabs 200 may be utilized for locking the end-flaps in place by leaving such tabs free instead of fastening them to the end-walls, in which case the insertible tongues on the end-flaps should be cut off, thereby permitting the flaps intermediate their ends to be inserted under the tabs 200, Fig. 26, the tabs provided being useful either as means for securing the corner-extensions against the box-ends by fastening the tabs to the latter, or as means for locking the box in set-up condition by leaving them free. Where the tabs 200 coöperate with the end-flaps for locking the box in set-up condition it is preferred that such end-flaps be formed with a longitudinally-extending folding line (not shown) as well understood in the art for facilitating the operation of inserting the flaps under the tabs.

What I claim as new, and desire to secure by Letters Patent, is—

1. A box formed of a base, walls extending upwardly therefrom, corner-extensions connected with walls of the box and lying flatwise against adjacent box-walls, said extensions being formed with sections lying against the extensions and the adjacent walls of the box and forming reinforcements for the box-corners, and means connected with said reinforcing sections and with said extensions lying between said extensions and adjacent box-walls for holding said sections in reinforcing position.

2. A box formed of a base, walls extending upwardly therefrom, corner-extensions connected with walls of the box and lying flatwise against adjacent box walls, said extensions being formed with sections lying against the extensions and the adjacent walls of the box and forming reinforcements for the box-corners, and means connected with said reinforcing sections toward their lower ends and with said extensions and lying between said extensions and adjacent box-walls for holding said sections in reinforcing position.

3. A box formed of a base, walls extending upwardly therefrom, corner-extensions connected with walls of the box and lying flatwise against adjacent box-walls, said extensions being folded along diagonal lines and formed with sections lying against the extensions and the adjacent walls of the box and forming reinforcements for the box-corners, and means carried by said sections and connected with said extensions, foldable along diagonal lines and lying between said extensions and adjacent box-walls for maintaining said sections in reinforcing position.

4. A box formed of a base, walls extending upwardly therefrom, corner-extensions connected with walls of the box and lying flatwise against adjacent box-walls, said extensions being formed with sections lying against the extensions and the adjacent walls of the box and forming reinforcements for the box-corners, and tongues carried by said sections and connected with said extensions lying between the extensions and the walls adjacent thereto, for the purpose set forth.

5. A box formed of a base, walls extending upwardly therefrom, corner-extensions connected with walls of the box and lying flatwise against adjacent box-walls, said extensions being folded along diagonal lines and formed with sections lying against the extensions and the adjacent walls of the box and forming reinforcements for the box-corners, and tongues carried by said sections and connected with said extensions foldable along diagonal lines and lying between said extensions and adjacent box-walls for maintaining said sections in reinforcing position.

6. A box formed of a base, walls extending upwardly therefrom, corner-extensions connected with walls of the box and lying flatwise against adjacent box-walls, said extensions being formed with sections connected thereto by upper and lower tongues and lying against said extensions and adjacent box-walls, each extension being folded along a diagonal line, and the lower tongue of each section likewise folded along a diagonal line, the lower tongues being located between said extensions and adjacent box-walls, for the purpose set forth.

7. A box formed of a base, walls extending upwardly therefrom, corner-extensions connected with walls of the box and lying flatwise against box-walls, said extensions being formed with sections lying against the extensions and adjacent walls of the box, and flaps on opposed walls of the box overlying said extensions and provided with means at their opposite ends for engaging with said sections adjacent to the walls of the box against which they lie, and means intermediate said last-named means adapted to be inserted between said sections and extensions for holding the flaps in place.

8. A box formed of a base, walls extending upwardly therefrom, corner-extensions connected with walls of the box and lying flatwise against box-walls, said extensions being formed with sections lying against the extensions and adjacent walls of the box and containing openings in their free end-portions, and flaps on opposed walls of the box overlying said extensions and provided with tongues at their opposite ends adapted to extend into said openings and in engagement with their walls, and tongues intermediate said first-named tongues adapted to be inserted between said sections and extensions for holding the flaps in place.

9. A blank for the purpose set forth, formed of a sheet of flexible material having parallel intersecting folding lines defining walls of the box, with the corner-portions of the blank lying between the folding lines beyond their intersections formed with diagonal folding lines and with sections at their outer ends each secured to the body of the corner-portion carrying it by tongues.

10. A blank for the purpose set forth, formed of a sheet of flexible material having parallel intersecting folding lines defining walls of the box with the corner-portions of the blank lying between the folding lines beyond their intersections formed with diagonal folding lines and with sections at their outer ends partially severed from the body of the corner-portions and defined by folding lines, the outer marginal portions of opposed ends of the blank being provided with folding lines defining flaps having partially severed portions forming tongues.

11. A blank for the purpose set forth, formed of a sheet of flexible material having parallel intersecting folding lines defining walls of the box with the corner-portions of the blank lying between the folding-lines beyond their intersections formed with diagonal folding-lines and with sections at their outer ends partially severed from the body of the corner-portions and defined by folding-lines, said sections containing apertures, and the outer marginal portions of opposed ends of the blank being provided with folding lines defining flaps having tongues at their extremities and partially severed portions intermediate said tongues forming other tongues, for the purpose set forth.

12. A collapsed box formed of a base, and opposed walls, corner-extensions carried on the ends of said walls and provided with reinforcing sections lying between the walls carrying them and the base of the box, flaps on opposed walls of the box lying flatwise against the walls carrying them, and tabs on the corner-extensions connected with adjacent walls of the box and overlying the ends of said flaps, for the purpose set forth.

13. A collapsed box formed of a base, opposed walls, corner-extensions carried on the ends of said walls, flaps on opposed walls of the box lying flatwise against the walls carrying them, and tabs on the corner-extensions connected with adjacent walls of the box and overlying the ends of the flaps, for the purpose set forth.

14. A box formed of a base, walls extending upwardly therefrom, corner-extensions connected with walls of the box and lying flatwise against adjacent box-walls, said extensions being formed with sections lying against the extensions and adjacent walls of the box, said sections containing openings both in the portions thereof which lie against said adjacent walls and in portions of said sections which lie against said extensions, and flaps on opposed walls of the box overlying said extensions and provided at their ends with tongues which extend laterally beyond the walls carrying said flaps and extend into said openings and interlock with the walls of the latter when the box-walls are erected.

15. A box formed of a base, walls extending upwardly therefrom, corner-extensions connected with walls of the box and lying flatwise against adjacent box-walls, said extensions being formed with sections lying against the extensions and adjacent walls of the box, said sections containing openings both in the portions thereof which lie against said adjacent walls and in portions of said sections which lie against said extensions, flaps on opposed walls of the box overlying said extensions and provided at their ends with tongues which extend laterally beyond the walls carrying said flaps and extend into said openings and interlock with the walls of the latter when the box-walls are erected, and means intermediate said tongues for holding said flaps in place.

SIEGMUND BACHMANN.

In presence of—
R. A. SCHAEFER,
JOHN WILSON.